Patented Aug. 11, 1925.

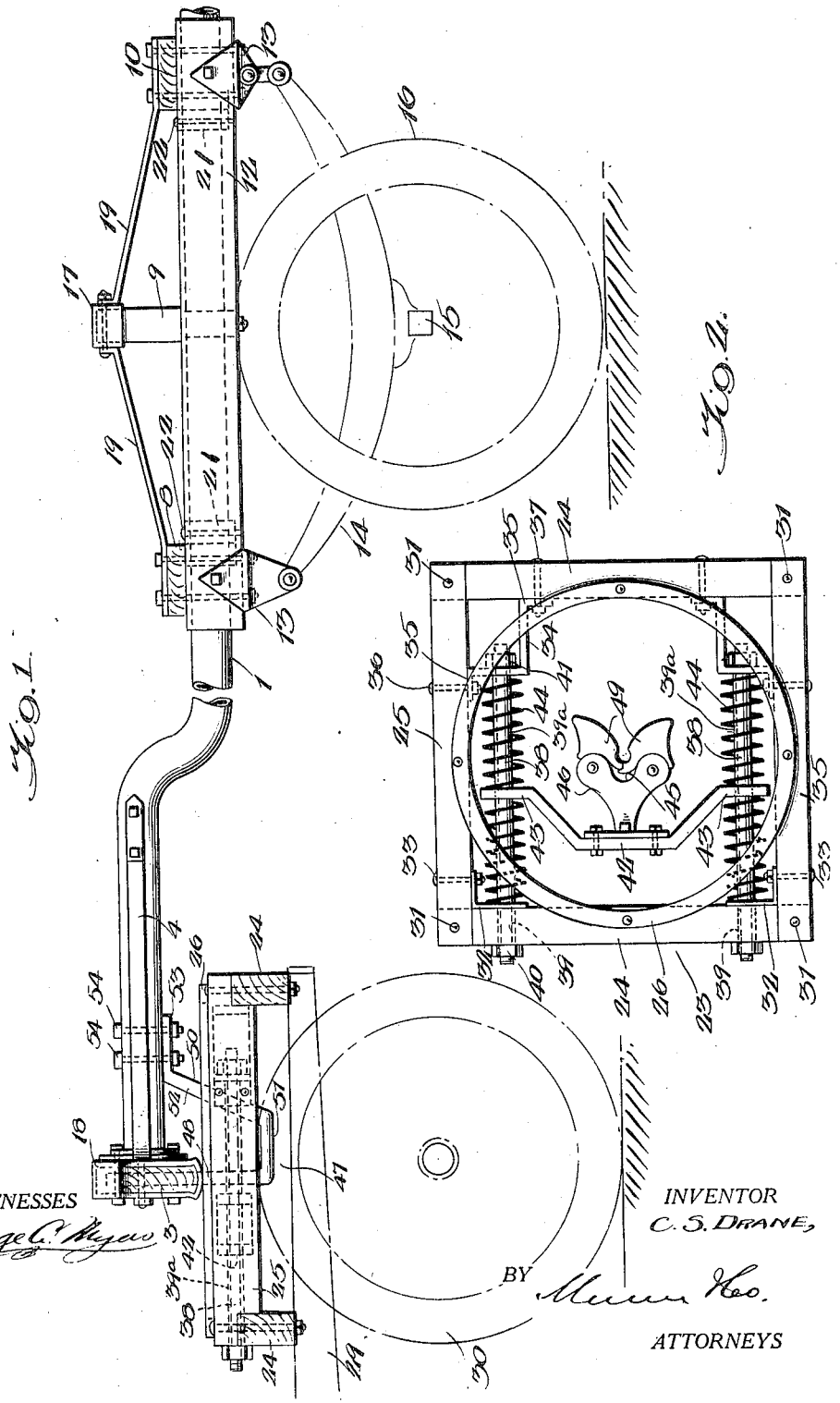

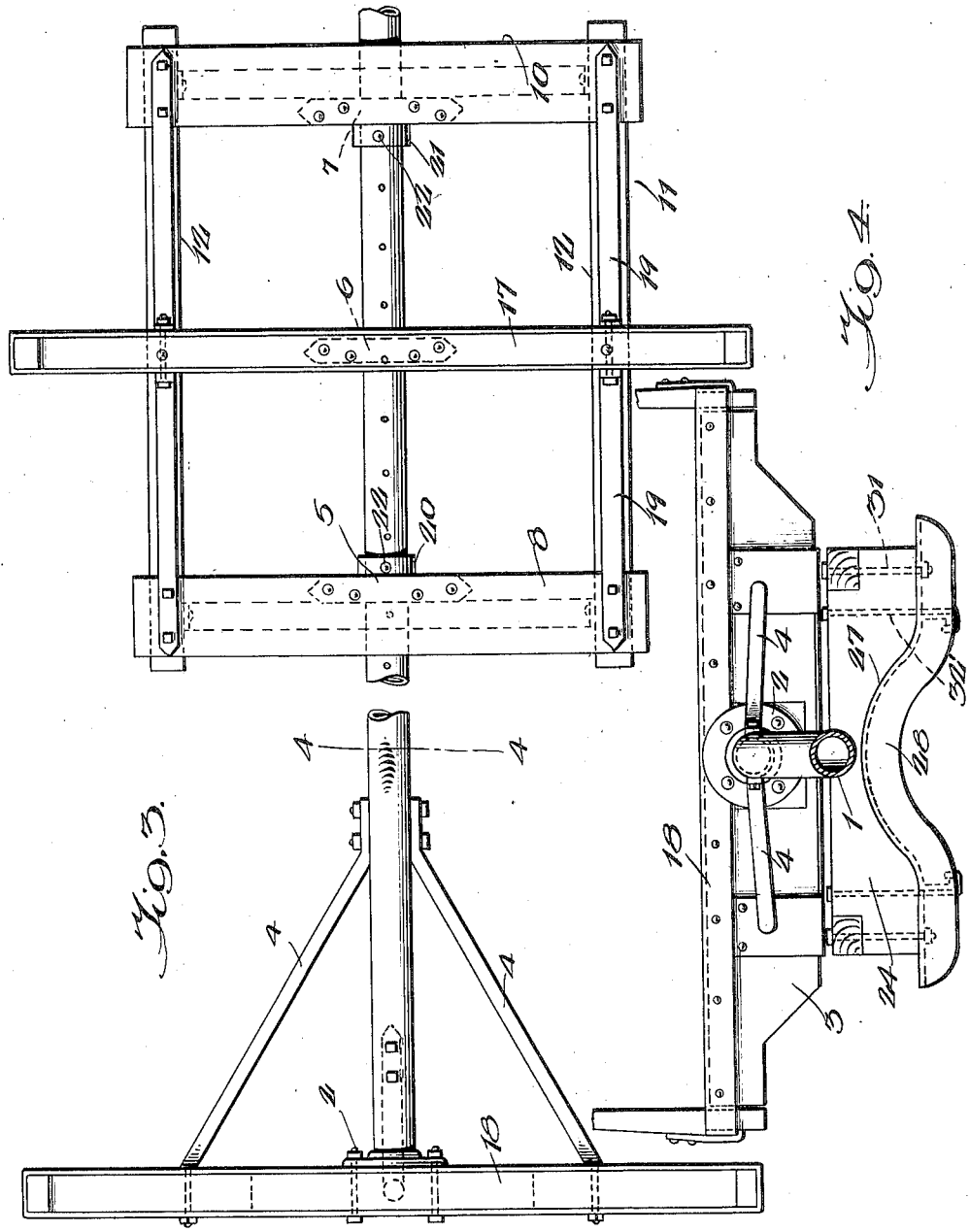

1,548,987

UNITED STATES PATENT OFFICE.

CHARLES SISSON DRANE, OF MEMPHIS, TENNESSEE.

TRAILER FOR VEHICLES.

Application filed January 15, 1924. Serial No. 686,388.

*To all whom it may concern:*

Be it known that I, CHARLES SISSON DRANE, a citizen of the United States, residing at Memphis, in the county of Shelby, State of Tennessee, have invented certain new and useful Improvements in Trailers for Vehicles, of which the following is a specification.

This invention relates to improvements in trailers for vehicles, and it consists in the combinations, constructions and arrangements herein described and claimed.

An object of the invention is to provide a trailer having facilities whereby it may be connected with the frame of a draft or leading vehicle in such manner that shocks and jars occasioned by the jerky movements of the leading vehicle in traversing uneven surfaces or because of the starting and stopping of the leading vehicle, and dissipated without being transmitted to the frame of the trailer.

A further object of the invention is to provide a trailer of the character described which is adapted to be connected with a draft or leading vehicle in such manner that the angular relation of the longitudinal axis of the trailer to the longitudinal axis of the leading vehicle may be varied within a relatively great range without interfering with the draft-produced movements of the vehicle or causing any additional stress on the leading vehicle.

A further object of the invention is to provide a trailer of the character described means for connecting the trailer to the frame of a draft vehicle in such manner that the free end portion of the trailer may have a relatively great up and down movement without causing strain of the elements which connect the trailer to the draft vehicle.

A still further object of the invention is to provide in a trailer of the character described means for connecting a truck of the trailer to the reach bar of the trailer so that the truck may oscillate vertically about the axis of the reach bar without tending to cause any torsional strain on the frame of the leading vehicle or of the parts connecting the trailer to the leading vehicle.

Other objects and advantages will be apparent from the following description, considered in conjunction with the accompanying drawings, in which:

Figure 1 is a side elevation showing a trailer embodying the invention connected at its front end with the frame of a draft vehicle, the latter as well as the wheels and the spring suspension elements of the trailer being shown more or less diagrammatically, Figure 2 is a plan view showing certain of the elements of the connection between the running gear of the trailer and the vehicle frame, Figure 3 is a plan view of the trailer, and Figure 4 is a section along the line 4—4 of Figure 3.

In carrying out the invention, I provide a reach bar 1 which preferably consists of a length of pipe having the forward end portion thereof offset vertically in respect to the remainder of the reach bar. The reach bar 1 is rigidly secured at its forward end, as at 2, to a front bolster 3, the connection of the reach bar with the bolster being intermediate of the length of the latter. The vertically offset forward end portion of the reach bar also is connected with and stayed to the bolster 3 by a pair of divergent stay bars 4 which are connected at their rearward ends to opposite sides of the forward end portion of the reach bar and then diverge apart, being attached at their forward ends to the bolster 3 respectively at points located approximately midway between the opposite ends of the bolster and the transverse medial line of the bolster.

The rearward end portion of the reach bar is journaled in bearings indicated respectively at 5, 6 and 7 (see Fig. 3), which bearings may be provided by securing straps to the undersides of the spaced transverse members 8, 9 and 10, respectively, of a truck frame, indicated generally 11. The bearings 5, 6 and 7 are aligned axially and the axes thereof lie substantially in the longitudinal median line of the truck frame. The truck frame also includes a pair of side members 12 with which the transverse members 8, 9 and 10 are connected. The side frame members are connected by suitable shackles, as at 13, in Figure 1, to the ends of semi-elliptical springs such as that shown more or less diagrammatically at 14 in Figure 1, the springs in turn being attached to an axle 15 on which ground wheels such as that indicated at 16 are mounted. The truck frame 11 thus will be supported resiliently at its sides upon the axle 15 and is permitted to oscillate vertically above the axis of the rearward end portion of the rear bar. It thus will be manifest that the ground wheels at opposite ends of the axle 15 may be disposed at different levels as when one of the wheels drops into a depression in the earth, without any torsional strain of the reach bar or of the parts with which the reach bar is rigidly connected. The truck frame 11 may be moved along the rearward end portion of the reach bar which slides in the bearings 5, 6 and 7 to vary within a considerable range the distance between a rest or support member 17 which is superimposed upon the intermediate transverse frame member 9 and a similar rest or supporting member 18 which is superimposed upon the bolster 3. The rest member is secured to the intermediate transverse frame member 9 and is also stayed by bars 19 to the end transverse members of the truck frame. The rest or supporting member 18 is rigidly secured to the bolster 3. The truck 11 may be releasably held in adjusted position on the reach bar through the agency of a pair of stop collars 20 and 21, respectively, which slide on the reach bar between the end transverse members 8 and 10 and which may be secured respectively against the inner or confronting faces of the end transverse members 8 and 10 by pins or screws 22 extending through radial openings in the collars into engagement with openings in the reach bar, whereby the truck frame 11 will be releasably held against longitudinal movement along the reach bar but is permitted to oscillate about the axis of the reach bar in the manner hereinbefore described.

The present invention contemplates the provision of an improved means for connecting the running gear of the trailer to the frame of a draft or leading vehicle. In this connection, the term running gear is used to designate the construction comprised of the parts described in the foregoing. Such connecting means comprises a substantially square open frame 23 formed of connected together pairs of transverse members 24 and side members 25. This frame has a fifth wheel 26 secured thereon in centered relation thereto. The frame has one of the transverse members 24 suitably cut away as indicated at 27 in Figure 4 to closely overlie the transverse member 28 at the rearward end of the side sills 29 of the frame of an automotive vehicle of a well known type of construction. The side members 25 of the frame extend upon the corresponding side sills 29 and the second transverse member 24 spans such sills at an appreciable distance forwardly of the rearward ends of the sills, the arrangement preferably being such that the frame 23 is disposed directly above the rear ground wheels 30 of the draft vehicle. The transverse members 24 are attached to the side frame members 25 by bolts 31, and certain of these bolts also extend through the transverse member 28 of the frame of the draft vehicle to secure the frame 23 to the frame of the draft vehicle. Hook bolts such as indicated at 32' in Figure 4 also may be employed to secure the frame 23 to the side sills of the frame of the draft vehicle.

The forward transverse member 24 is braced to the side members 25 at the forward corners of the frame 23 by angle braces 32 which are connected to the frame by bolts 33 as shown. The rear transverse member 24 also is braced to the side members 25 by angular brace members 34 which have outwardly extending attaching portions 35 at the ends of the members thereof, one attaching portion 35 of each brace member 34 being secured to one of the side frame members 25 by a bolt 36, while the other attaching portion 35 of the brace member 34 is attached to the transverse member 24 adjacent to one of the corners member 24 adjacent to one of the corners of the frame by a bolt 37. With this arrangement one of the members of each of the angle braces 34 will extend in parallel relation to the side frame members 25 and the other member of each brace 34 will extend in parallel relation to the transverse frame members 24. The last mentioned member of each of the braces 34 will be positioned in parallel relation to the corresponding member of the angle brace 32 and such corresponding members of the angle braces 32 and 34 are provided with aligned openings through which extends a rod 38. The forward transverse frame member 24 also has openings 39 respectively aligned with the openings through members of the angle braces 32 and the rods 38 extend through such openings 39. The rods 38 are held against axial movement by nuts 40 and 41, respectively, the nut 40 being in threaded engagement with the forward end portion of the rod, while the nut 41 is threaded on the rearward end portion of each rod 38 and engages with the brace 34.

A draft bar 42 has the end portions 43 thereof offset in respect to the intermediate portion thereof. The end portions 43 of the draft bar are provided with openings slidably receiving tubular members 39ª which are loosely mounted on the rods 38, whereby the draft bars will be supported adjacent to its ends for sliding guided movement longitudinally of the frame 23. Each tubular member 39ª is in abutting relation at its opposite ends with the aforesaid corresponding members of angle braces 32 and 34 and it thus will be manifest that the frame 23 will be securely braced when the nuts 40 and 41 at opposite ends of each rod 38 are tightened. The expansion springs 44 are coiled about the rods 38 and are under compression, each expansion spring reacting at one end against one of the braces 34 and at its opposite end against the corresponding brace member 32. The end portions 43 of the draw bar 42 are disposed between the corresponding convolutions of the expansion springs 44, and are so positioned along the tubular members 39ª that the socket 45 of a coupler head 46 carried by the intermediate portion of the draw bar normally is positioned at the center of the frame 23 and in line with the center of the fifth wheel 26.

The bolster 3 rests upon the fifth wheel 26 and is held against displacement from the latter by a king pin 47 which includes a straight member 48 which is secured adjacent to its upper end to the bolster 3 and depends from the latter through the socket 45 of the coupling head, being held against lateral displacement from the coupling head by a pair of pivoted latching members 49 which are carried by the coupling. Below the coupling head, the straight vertical member 48 is merged into a brace member 50 which is comprised in the king pin and which is bent at its juncture with the member 48 to extend horizontally, at 51, and then obliquely upward at 52 and finally horizontally, at 53, to provide an attaching portion which is apertured to receive bolts 54 which thus attach the brace member 50 to the reach bar 1.

From the foregoing description of the various parts of the device, the operation thereof may be readily understood. Any stress transmitted from the trailer through the king pin to the draft bar 42 will be distributed throughout the frame 23 because of the arrangement of the expansion springs, tubular members 39ª, supporting rods therefor and braces 34, which connect the supporting rods 38 at their rearward ends with both the transverse and the longitudinal or side members of the frame 23. Moreover, shocks and jars transmitted either from the running gear of the trailer to the draft bar or from the frame of the draft vehicle to the frame 23 will be dissipated by the springs 44 and in consequence there will be no added strain either on the frame of the draft vehicle or the frame of the trailer because of the connection of the trailer and draft frames. It also will be apparent that the bracing of the vertical member 48 of the king pin to the reach bar will prevent breaking of the king pin because of any stresses to which the latter is likely to be subjected in the service for which it is intended. Moreover, the stresses which might tend to break the king pin in the means for connecting the trailer and a draft vehicle of ordinary construction together will be almost entirely eliminated when my improved trailer is used for the reason that the springs 44 will dissipate such stresses without transmitting them to the king pin.

The vertical offsetting of the forward end portion of the reach bar permits positioning of the reach bar at various angular relations to the longitudinal axis of the draft vehicle without the reach bar coming into contact with the frame of the draft vehicle.

The mounting of the truck frame 11 upon the rearward portion of the reach bar in the manner described permits oscillation of such truck frame about the axis of the rearward portion of the reach bar without any torsional strain of the reach bar or of the connections thereof.

In the form of the device which is exhibited in the drawings, the rest members 17 and 18 are adapted to support lengths of lumber or like articles. However, it will be obvious that bodies or supporting members of various descriptions may be supported upon the frame 11 and the bolster 3 without departing from the spirit and scope of the invention.

I claim:

1. In a trailer, a reach pole movably supported adjacent to its rearward end, a bolster upon which the forward end portion of the reach pole is secured, a fifth wheel providing a bearing for said bolster, a frame adapted to be supported upon the frame of a draft vehicle and providing a support for said fifth wheel, a draft bar extending transversely of said fifth wheel supporting frame and supported for bodily movement longitudinally of said fifth wheel supporting frame, a coupler head carried by said draft bar, spring means yieldingly holding said draft in such position in respect to said fifth wheel supporting frame that said coupler head normally will be positioned in vertical alignment with the center of said fifth wheel, and a king pin carried by said bolster and engaged with said coupler head to connect said bolster with said draft bar, said fifth wheel supporting frame comprising pairs of spaced apart connected together transverse and longitudinal members and said draft bar supporting means including braces respectively staying adjacent transverse and longitudinal members of the fifth wheel supporting frame to each other.

2. In a trailer, a reach pole, a bolster upon which said reach pole is secured at the forward end of the latter, and a king pin having a straight portion depending from said bolster and having a brace portion merged at its lower end into said straight portion and being secured at its other end to said reach pole rearwardly of the juncture of the latter with said bolster.

3. In a vehicle, a fifth wheel supporting frame comprising connected together pairs of parallel frame members, angle braces at each juncture of two adjacent frame members, confronting portions of corresponding angle braces having aligned openings therethrough, rods extending through aligned openings, a tubular member disposed on each rod between the confronting portions of said corresponding braces, the ends of said tubular member abutting said confronting portions of the braces, and nuts threadedly engaging the opposite end portions of each rod for holding said corresponding braces and said tubular member in clamped together relation.

4. In a draft connection of a trailer, a frame adapted to be secured upon the frame of a draft vehicle, said first named frame comprising connected together pairs of parallel frame members, angle braces at each juncture of two adjacent frame members, confronting portions of corresponding angle braces having aligned openings therethrough, rods extending through aligned openings, a tubular member disposed on each rod and between the confronting portions of said corresponding braces, the ends of said tubular member abutting said confronting portions of the braces, nuts threadedly engaging the opposite end portions of each rod for holding said corresponding braces and said tubular member in clamped together relation, a draft bar slidably supported adjacent to its ends on parallel tubular members, and spring means yieldingly resisting sliding movement of said draft bar along said tubular members.

CHARLES SISSON DRANE.